United States Patent
Asati et al.

(10) Patent No.: US 9,756,013 B2
(45) Date of Patent: Sep. 5, 2017

(54) DISTRIBUTED MAPPING OF ADDRESS AND PORT (MAP) BETWEEN A PROVIDER EDGE DEVICE AND CUSTOMER PREMISE EQUIPMENT DEVICES

(71) Applicant: Cisco Technology, Inc., San Jose, CA (US)

(72) Inventors: Rajiv Asati, Morrisville, NC (US); Wojciech Dec, Amsterdam (NL); Yixing Ruan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 14/328,296

(22) Filed: Jul. 10, 2014

(65) Prior Publication Data

US 2016/0014071 A1    Jan. 14, 2016

(51) Int. Cl.
*H04L 29/12* (2006.01)

(52) U.S. Cl.
CPC ........ *H04L 61/6059* (2013.01); *H04L 61/251* (2013.01); *H04L 61/6063* (2013.01); *H04L 61/2015* (2013.01)

(58) Field of Classification Search
CPC ... H04L 45/741; H04L 47/20; H04L 41/5041; H04L 12/4633; H04L 61/2015; H04L 29/12801; H04L 69/167; H04L 12/2801; H04L 61/251; H04L 61/2514; H04L 61/2517; H04L 63/30; H04L 63/029; H04L 61/6063; H04L 61/6059; H04N 21/443

See application file for complete search history.

(56) References Cited

U.S. PATENT DOCUMENTS

| | | | |
|---|---|---|---|
| 7,490,351 B1 * | 2/2009 | Caves | H04L 29/12028 726/13 |
| 7,930,734 B2 * | 4/2011 | Foo et al. | 726/5 |
| 8,250,189 B1 * | 8/2012 | Breau et al. | 709/222 |
| 8,699,378 B2 * | 4/2014 | Kormann et al. | 370/254 |
| 9,148,401 B2 * | 9/2015 | Shen | H04L 29/12915 |
| 9,258,272 B1 * | 2/2016 | Durand | H04L 61/2517 |
| 2007/0180483 A1 * | 8/2007 | Popoviciu | H04L 12/2801 725/111 |
| 2009/0125957 A1 * | 5/2009 | Singh | H04N 21/41 725/111 |

(Continued)

OTHER PUBLICATIONS

Shah et al., "RFC 6575: Address Resolution Protocol (ARP) Mediation for IP Internetworking of Layer 2 VPNs", Jun. 2012, Intenret Engineering Task Force (IETF), ISSN: 2070-1721.*

(Continued)

*Primary Examiner* — Vivek Srivastava
*Assistant Examiner* — Todd L Barker
(74) *Attorney, Agent, or Firm* — Parker Ibrahim & Berg LLC; James M. Behrnke; Stephen D. LeBarron

(57) ABSTRACT

In one embodiment, a provider edge (PE) device in a computer network determines an IPv4 address and link-layer address for each adjacent customer premise equipment (CPE) device, and assigns each CPE device a unique IPv6 address. The PE device stores a key-pair mapping between the unique IPv6 address and combined IPv4 and link-layer address for each adjacent CPE, the mapping bound by a CPE session context, and uses the CPE session context to convert between IPv4 and IPv6 for all network traffic to and from a particular CPE device.

21 Claims, 12 Drawing Sheets

(56) References Cited

U.S. PATENT DOCUMENTS

| | | | | |
|---|---|---|---|---|
| 2010/0098083 | A1* | 4/2010 | Yamazaki et al. | 370/392 |
| 2010/0142373 | A1* | 6/2010 | Jin et al. | 370/230 |
| 2010/0309813 | A1* | 12/2010 | Singh | H04L 12/2801 370/254 |
| 2011/0208845 | A1* | 8/2011 | Droms | H04L 12/2801 709/222 |
| 2012/0243547 | A1* | 9/2012 | Pardo-Blazquez et al. | 370/401 |
| 2013/0070770 | A1* | 3/2013 | Zha | H04L 12/4633 370/392 |
| 2013/0155965 | A1* | 6/2013 | Koodli | 370/329 |
| 2013/0235871 | A1* | 9/2013 | Brzozowski | H04L 61/251 370/392 |
| 2014/0032782 | A1* | 1/2014 | Jiang et al. | 709/238 |
| 2014/0079066 | A1* | 3/2014 | Tseng et al. | 370/392 |
| 2014/0105214 | A1* | 4/2014 | Li et al. | 370/392 |
| 2014/0211714 | A1* | 7/2014 | Li et al. | 370/329 |
| 2014/0310307 | A1* | 10/2014 | Levy et al. | 707/769 |
| 2014/0317269 | A1* | 10/2014 | Munoz de la Torre Alonso | H04L 47/20 709/224 |
| 2014/0359162 | A1* | 12/2014 | Park et al. | 709/245 |

OTHER PUBLICATIONS

Cui et al., "Lightweight 4 over 6 in access network draft-cui-softwire-b4-translated-ds-lite-02", Sep. 30, 2011, Network Working Group.*

Brockners, et al., "Gateway-Initiated Dual-Stack Lite Deployment", Request for Comments 6674, Jul. 2012, 15 pages, Internet Engineering Task Force Trust.

Li, et al., "IP/ICMP Translation Algorithm", Request for Comments 6145, Apr. 2011, 33 pages, Internet Engineering Task Force Trust.

Li, et al., "Mapping of Address and Port using Translation (MAP-T)", Internet-Draft, <draft-ietf-softwire-map-t-05>, Feb. 10, 2014, 24 pages, Internet Engineering Task Force Trust.

Penno, et al., "Stateless DS-Lite", Internet—Draft, <draft-penno-softwire-sdnat-02>, Mar. 2012, 12 pages, Internet Engineering Task Force Trust.

Srisu Resh, et al., "IP Network Address Translator (NAT) Terminology and Considerations", Request for Comments 2663, Aug. 1999, 30 pages, The Internet Society.

Troan, et al., "Mapping of Address and Port with Encapsulation (MAP)", Internet—Draft, <draft-ietf-softwire-map-10>, Mar. 2015, 32 pages, Internet Engineering Task Force Trust.

* cited by examiner

DISTRIBUTED MAPPING OF ADDRESS AND PORT (MAP) BETWEEN A PROVIDER EDGE DEVICE AND CUSTOMER PREMISE EQUIPMENT DEVICES

TECHNICAL FIELD

The present disclosure relates generally to computer networks, and, more particularly, to distributed mapping of address and port (MAP) between a provider edge (PE) device and customer premise equipment (CPE) devices.

BACKGROUND

MAP (Mapping of Address and Port) is technology that assigns a set of functions to be executed on a MAP-enabled CPE device (or customer edge router (CE)) and a Border Relay (BR) to provide IPv4 address sharing by using IPv6. Examples of MAP are described in the Internet Engineering Task Force (IETF) Internet Drafts entitled "Mapping of Address and Port with Encapsulation" <draft-ietf-softwire-map>, by Troan et al., and "Mapping of Address and Port using Translation (MAP-T)" <draft-ietf-softwire-map-t>, by Li et al. The key characteristics, in a MAP-T form, are that:
  i) the CE router performs a "port-restricted stateful NAT44+stateless NAT46" operation, e.g., where a NAT44 function converts an IPv4 address to another IPv4 address and TCP/UDP port (network address translation, "NAT"), such as in accordance with the IETF's Request for Comment (RFC) RFC2663, and where a stateless NAT64 function converts, such as in accordance with RFC6145, is extended to allow stateless mapping of IPv4 and transport layer port ranges to IPv6 address space; and
  ii) the BR performs a modified stateless NAT64 operation, which allows the BR element to be realized with superior performance and scalability as opposed to stateful carrier-grade NAT (CGN) solutions.

Many operators attempting to deploy MAP are currently struggling to get the MAP-T CE function implemented. In particular, the MAP-T CE function requires a modification of (existing) NAT44 functionality and the addition of stateless NAT64 and also associated configuration options (e.g., MAP DHCPv6 options) besides IPv6. All of this occurs across a wide variety of existing devices and configurations, where some may not be upgradable to IPv6, thus requiring a change/upgrade to new devices (having wired or wireless uplinks). These technical challenges translate to a bottleneck for MAP deployment and exacerbated IPv4 exhaustion (that is, running out of uniquely assigned IPv4 addresses).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a provider edge (PE) device in a computer network determines an IPv4 address and link-layer address for each adjacent customer premise equipment (CPE) device, and assigns each CPE device a unique IPv6 address. The PE device stores a key-pair mapping between the unique IPv6 address and combined IPv4 and link-layer address for each adjacent CPE, the mapping bound by a CPE session context, and uses the CPE session context to convert between IPv4 and IPv6 for all network traffic to and from a particular CPE device.

According to one or more additional embodiments of the disclosure, a CPE device receives a shared and public IPv4 address for the CPE device along with port range restriction information. The CPE device enables use of port-restricted NAT44, and is configured to use a particular port range within bounds of the port range restriction information. The CPE device then communicates IPv4 packets with an adjacent IPv6-connected PE device, where a CPE session context of the IPv4 packets allows the PE device to convert between IPv4 and IPv6 for all network traffic to and from the CPE device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
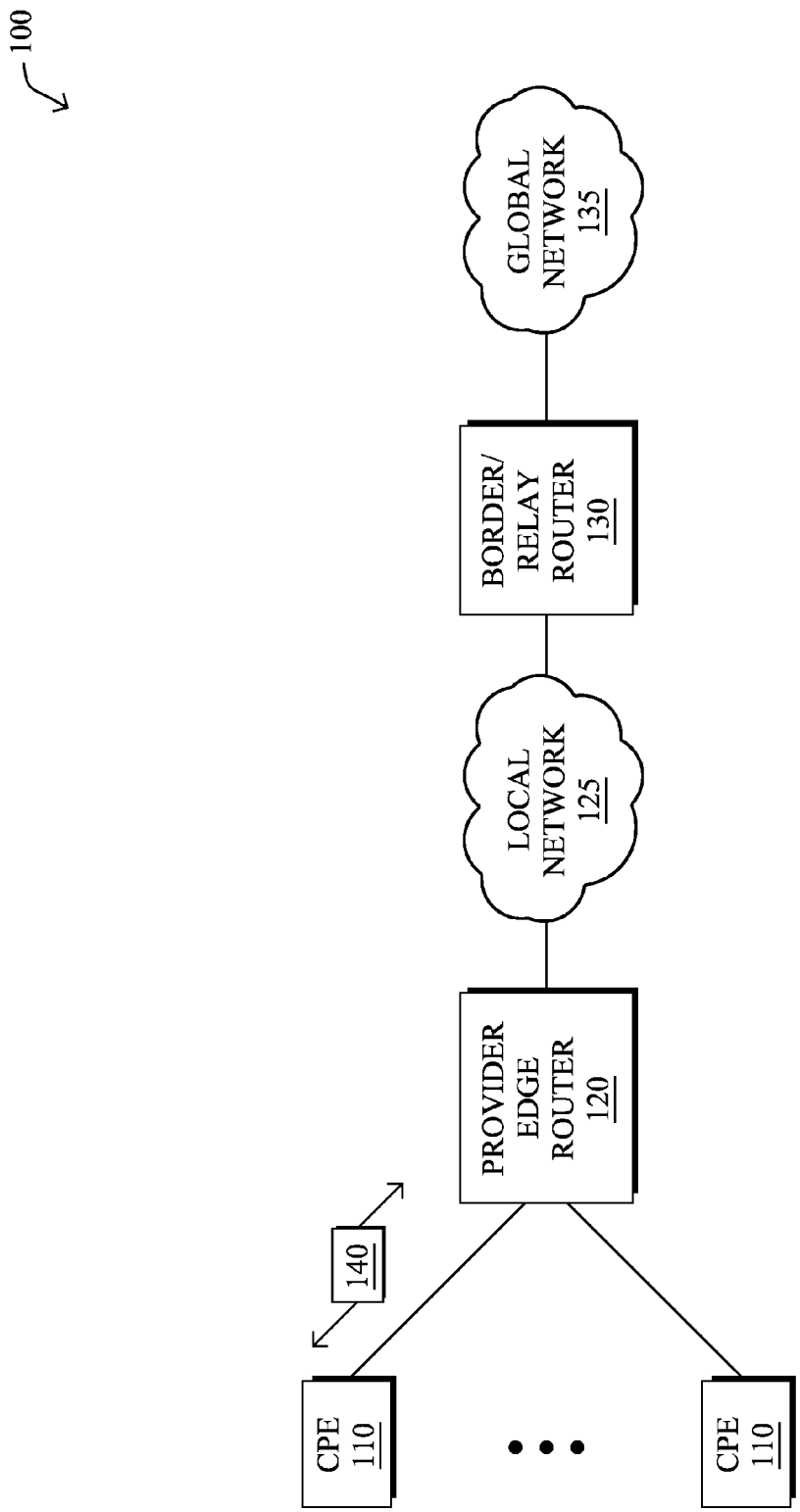
FIG. 1 illustrates an example computer network.

FIG. 1 is a schematic block diagram of an example computer network 100 illustratively comprising nodes/devices 200, such as customer-premises equipment (CPE) devices 110 (e.g., cable modems, wireless routers, etc., connected to one or more hosts, not shown), provider edge (PE) routers 120 (e.g., devices transitioning between local customer and/or provider networks 125), and border/relay routers 130 (e.g., devices interconnecting disparate networks with a global network 135), interconnected by various methods of communication. For instance, the links may be wired links or shared media, and may be used to establish and/or communicate with local networks 125 (e.g., LANs) and/or global networks 135 (e.g., WANs or the Internet). Illustratively, as described herein, the local network 125 may be configured according to the Internet Protocol version 6 (IPv6), while the links between the CPE devices and the PE devices may be configured according to IP version 4 (IPv4). Those skilled in the art will understand that any number of nodes, devices, links, etc. may be used in the computer network, and that the view shown herein is for simplicity. Also, those skilled in the art will further understand that while the network is shown using a certain device naming convention, the network 100 and the device names are merely an example illustration that is not meant to limit the disclosure.

Data packets (or frames) 140 may be exchanged among the nodes/devices of the computer network 100 using predefined network communication protocols such as certain known wired protocols, wireless protocols, or other protocols where appropriate, particularly according to either IPv4 or IPv6, where appropriate. In this context, a protocol consists of a set of rules defining how the nodes interact with each other.

Figure 2:
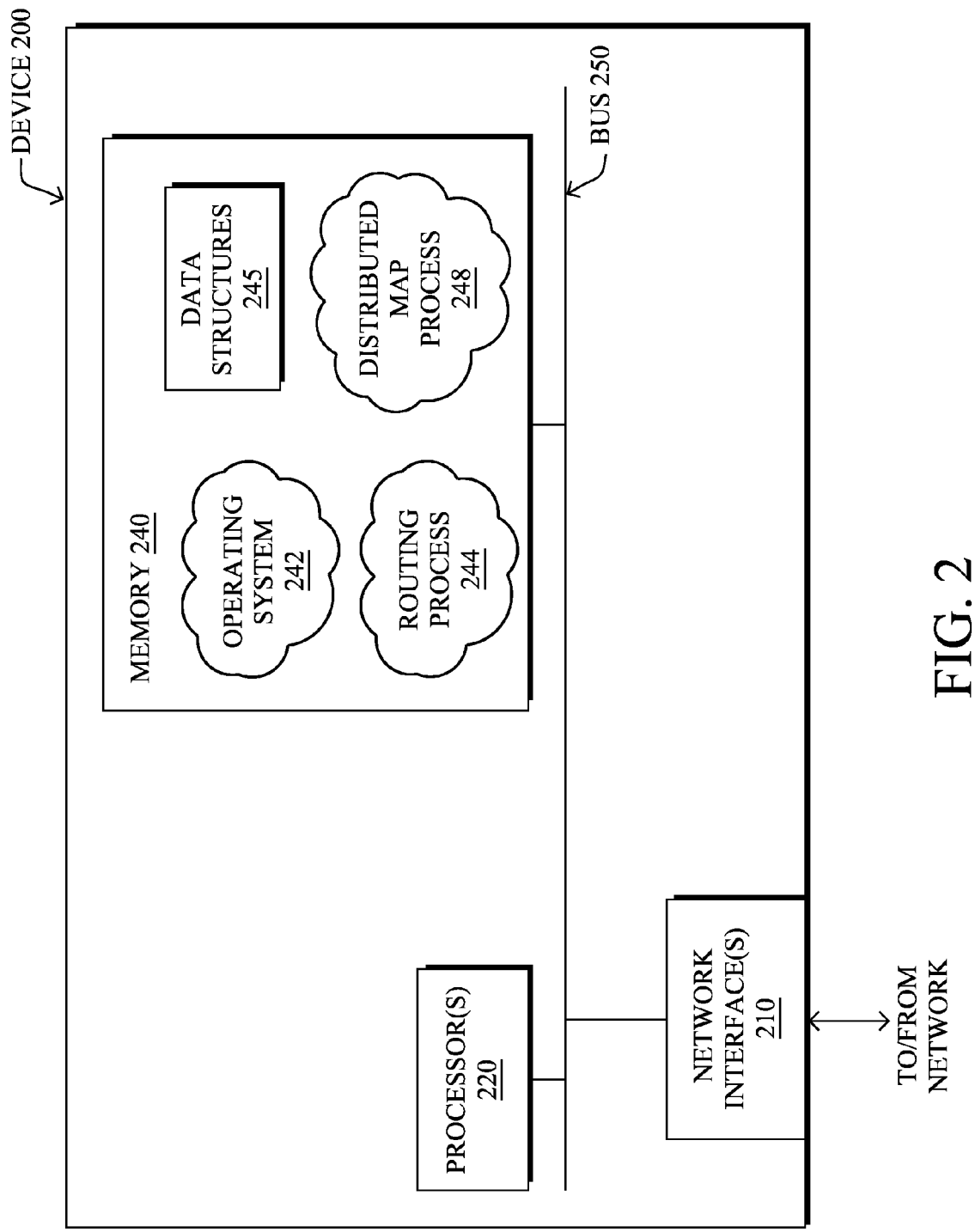
FIG. 2 illustrates an example network device.

FIG. 2 is a schematic block diagram of an example node/device 200 that may be used with one or more embodiments described herein, e.g., as any of the devices shown in FIG. 1 above, particularly PE devices 120 and CPEs 110 as described herein. The device may comprise one or more network interfaces 210 (e.g., wired, wireless, etc.), at least one processor 220, and a memory 240 interconnected by a system bus 250.

The network interface(s) 210 comprise the mechanical, electrical, and signaling circuitry for communicating data over links coupled to the network 100. The network interfaces may be configured to transmit and/or receive data using one or more communication protocols. Note, further, that the devices may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or logic elements adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process 244 and an illustrative "distributed MAP" process 248, as described herein. Note that while the processes are shown in centralized memory 240, alternative embodiments provide for one or more of the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes (e.g., IPv6 transition distributed MAP process 248 may be a component of routing process 244).

Routing process 244 comprises computer executable instructions executed by the processor 220 to perform functions provided by one or more routing protocols, such as in accordance with IPv4 and/or IPv6 routing protocols (depending on device) as will be understood by those skilled in the art. These functions may, on capable devices, be configured to manage a routing/forwarding table (a data structure 245) containing, e.g., data used to make routing/forwarding decisions. For example, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR), also referred to as Interior (or Internal) Gateway Protocols (IGPs), as well as the known Border Gateway Protocol (BGP).

As noted above, MAP (Mapping of Address and Port) is technology that assigns a set of functions to be executed on a MAP-enabled CPE device (or customer edge router (CE)) and a Border Relay (BR) to provide IPv4 address sharing by using IPv6. However, as also noted above, many operators attempting to deploy MAP are currently struggling to get the MAP-T CE function implemented, which translates to a bottleneck for MAP deployment and exacerbated IPv4 exhaustion.

The techniques herein, therefore, alleviate these burdens by moving the MAP NAT46 function from CPE router to the PE router, by an extension of the stateful IP session capabilities of the PE router. Said differently, the techniques herein move the subscriber MAP function from the CPE (where it traditionally lives) into the service provider's network (the first hop device), allowing non-MAP-aware CPEs (and optionally non-IPv6-configured CPEs) to be used.

Specifically, according to one or more embodiments of the disclosure as described in detail below, a PE device determines an IPv4 address and link-layer address for each adjacent CPE device, and assigns each CPE device a unique IPv6 address. Notably, the assignment of each CPE's IPv6 address may be derived as per the MAP algorithm, for instance, the edge router keeps a binding for each CE of its real IPv4+link-layer address and an IPv6 address compatible with the MAP domain the router is in. (That is, the IPv6 address is thus not just any address.) The PE device stores a key-pair mapping between the unique IPv6 address and combined IPv4 and link-layer address for each adjacent CPE, the mapping bound by a CPE session context, and uses the CPE session context to convert between IPv4 and IPv6 for all network traffic to and from a particular CPE device.

Illustratively, the techniques described herein may be performed by hardware, software, and/or firmware, such as in accordance with the distributed MAP process 248, which may comprise computer executable instructions executed by the processor 220 (or independent processor of interfaces 210) to perform functions relating to the techniques described herein, e.g., in conjunction with routing process 244. For example, the techniques herein may be treated as extensions to conventional protocols, such as conventional protocols that perform MAP functionality, and as such, may be processed by similar components understood in the art that execute those protocols, accordingly.

Operationally, the techniques herein propose a distributed approach for MAP functionality (also referred to as the MAP CE function), separating the port restricted stateful NAT44+ IPv4 forwarding function from the stateless NAT46 function. This approach seeks to lower the number of functions that need to reside on a CPE/CE, thus making it easier to implement and deploy, while still allowing it to be used in a MAP architecture with a stateless core MAP Border Relay 130. The decoupled NAT64 function is combined with additional intelligence in a PE device (e.g., a Broadband Network Gateway, IP-Edge gateway, etc.) that is adjacent to the CPE device.

According to one or more embodiments of the techniques herein, stateful port restricted network address and port translation (NAPT) (e.g., NAT44) is performed on the CPE device 110. (Multiple CPEs will continue to share the same IPv4 address.) Note that in one embodiment, it is assumed that direct layer-2 (L2) communication between the CPEs on a shared link segment is disabled, as is common in many service provider deployments, thus any address conflict is not an issue. Routed communication is still possible by means of the forwarding via the PE (as described below). Notably, in an alternative embodiment, CPE devices with plain NAT44 may also be used (i.e., those without port restricted NAT44).

Also according to the embodiments herein, the stateless CE MAP function (e.g., NAT64 or Tunneling64) is performed on the adjacent PE router 120 that already has the adjacent CPE context, such as an IP session (in case of BNG), IP-CAN (Connectivity Access Network) session (in case of packet data network gateway (PDN-GW)), Service-Flow (in case of cable modem termination system (CMTS)), etc.

Further, a key-pair is stored on the PE between the IPv6 address and the combined IPv4+link-layer (MAC) address for each adjacent CE (e.g., effectively treating the IPv4+ link-layer info as an extended adjacency entry in an IPv6 forwarding table). This key-pair would be stored along with the CPE context. Said differently, a state effectively equivalent to *stateful* NAT64+link layer info is created, but per the techniques herein, this is accomplished by extending an existing stateful data set (the IP session) and associating stateless NAT64/tunneling as a feature. This drives superior implementation and scale. For example, platforms scaling to millions of IP sessions can, via the techniques herein, continue to do so while coupling stateless hardware-accelerated NAT64/tunneling into the equation, to achieve the combined system functionality of MAP at large scale and high throughput.

FIGS. 3A-5C demonstrate an example usage of the techniques herein according to an illustrative packet flow. First, in FIG. 3A, the CPE device 110 obtains a shared and public IPv4 address with port range restriction information (optionally also an IPv6 prefix), such as through using the dynamic host configuration protocol (DHCP). Also, the CPE device is enabled with the port-restricted NAT44 and configured to use a particular port range (in line with the MAP indexing). Note that in the case of cable multiple system operators (MSOs), the Data over Cable Service Interface Specification (DOCSIS) protocol could be used to convey the port-range using vendor-specific DOCSIS fields (e.g., TLVs). (Note that in one embodiment herein, the IPv4 port restriction is performed by the PE, e.g., using information derived from the user session context, as described herein.)

Figure 3A:
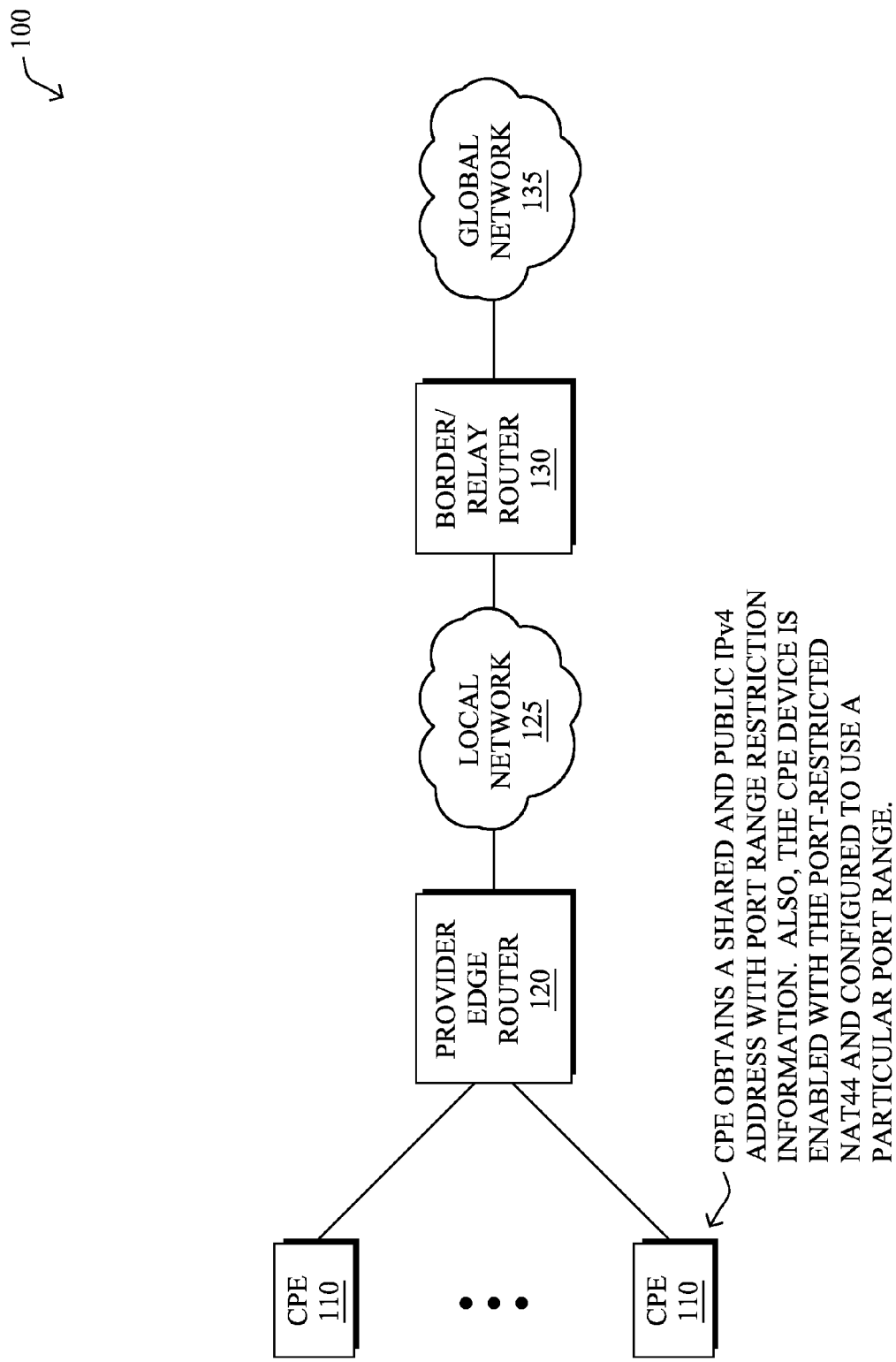
FIGS. 3A-3B illustrate an example configuration of a distributed MAP function between CPE devices and a PE device in a computer network.
Figure 3B:
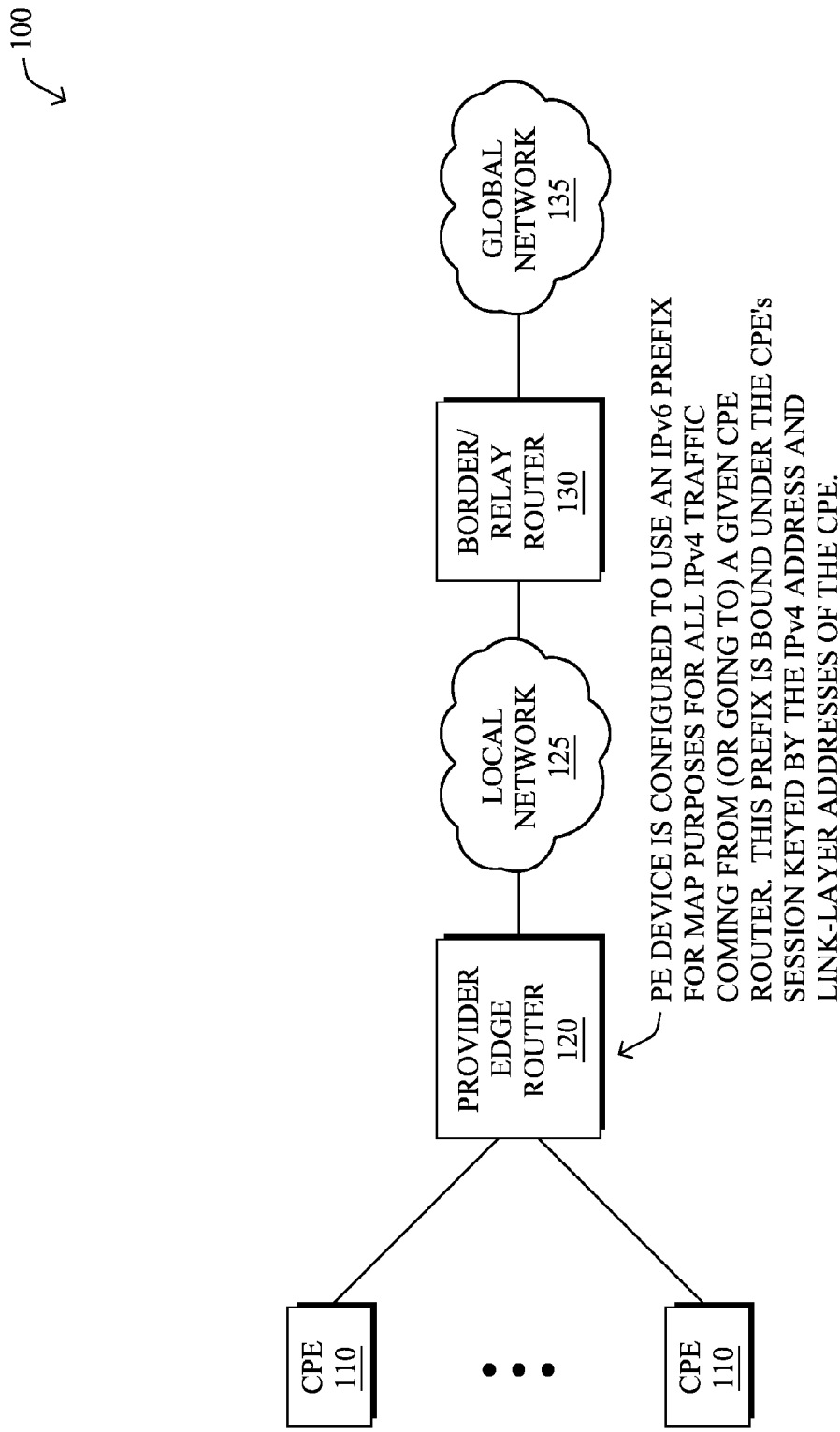

As shown in FIG. 3B, a PE device 120 is configured to use an IPv6 prefix for MAP purposes for all IPv4 traffic coming from (or going to) a given CPE router. This prefix is bound under the CPE's session keyed by the IPv4 address and link-layer addresses of the CPE. Note that the prefix can be separately assigned or derived from the DHCPv6-PD IPv6 prefix (e.g., /60 or /56) assigned to each CPE device, following the prefix exclude option, as will be appreciated by those skilled in the art. Note also that the PE device is configured with the IPv6 information applicable to the MAP domain.

Figure 4A:
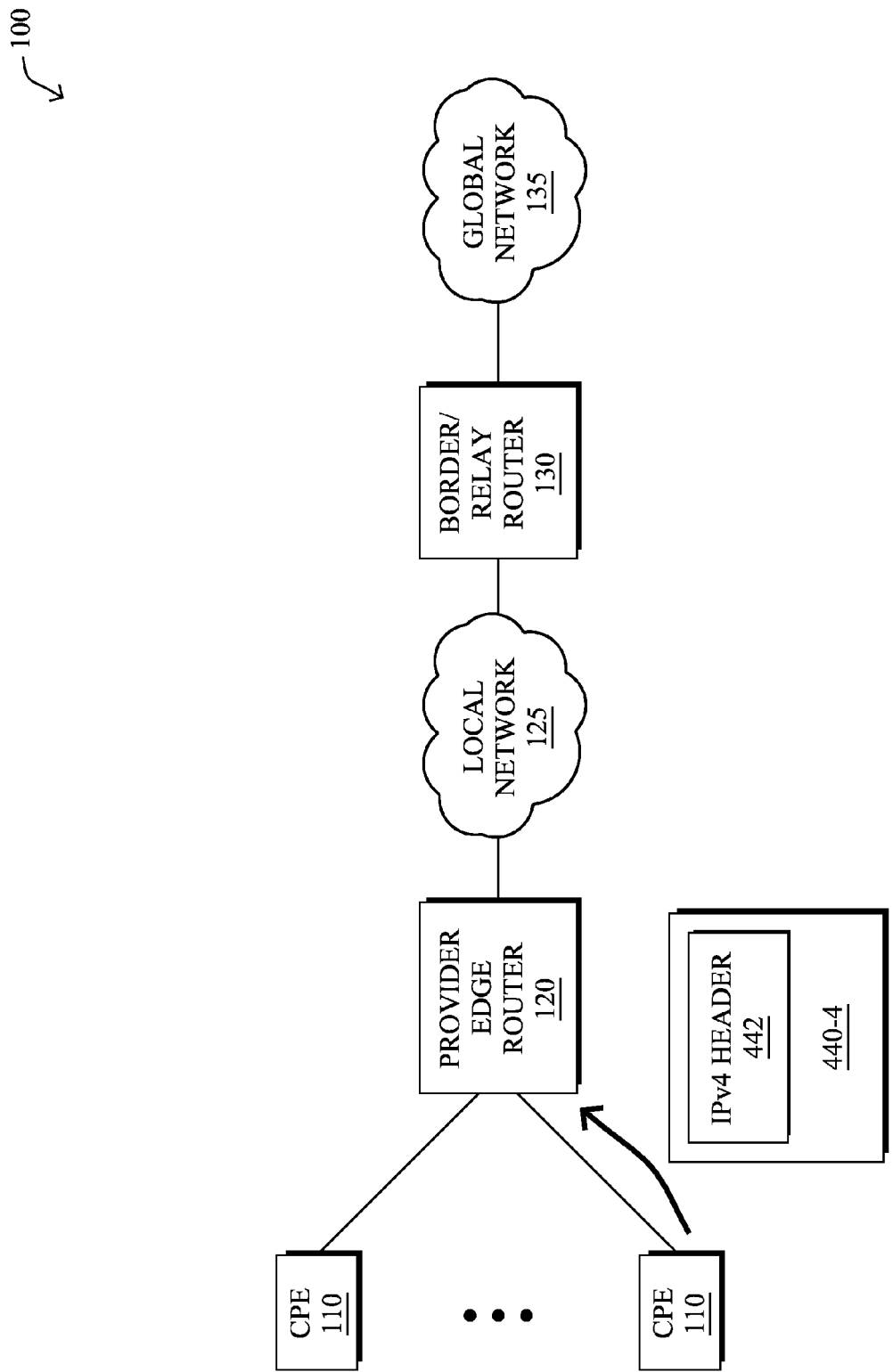
FIGS. 4A-4C illustrate an example packet flow from a CPE to a border relay using a distributed MAP function between CPE devices and a PE device in a computer network.
Figure 4B:
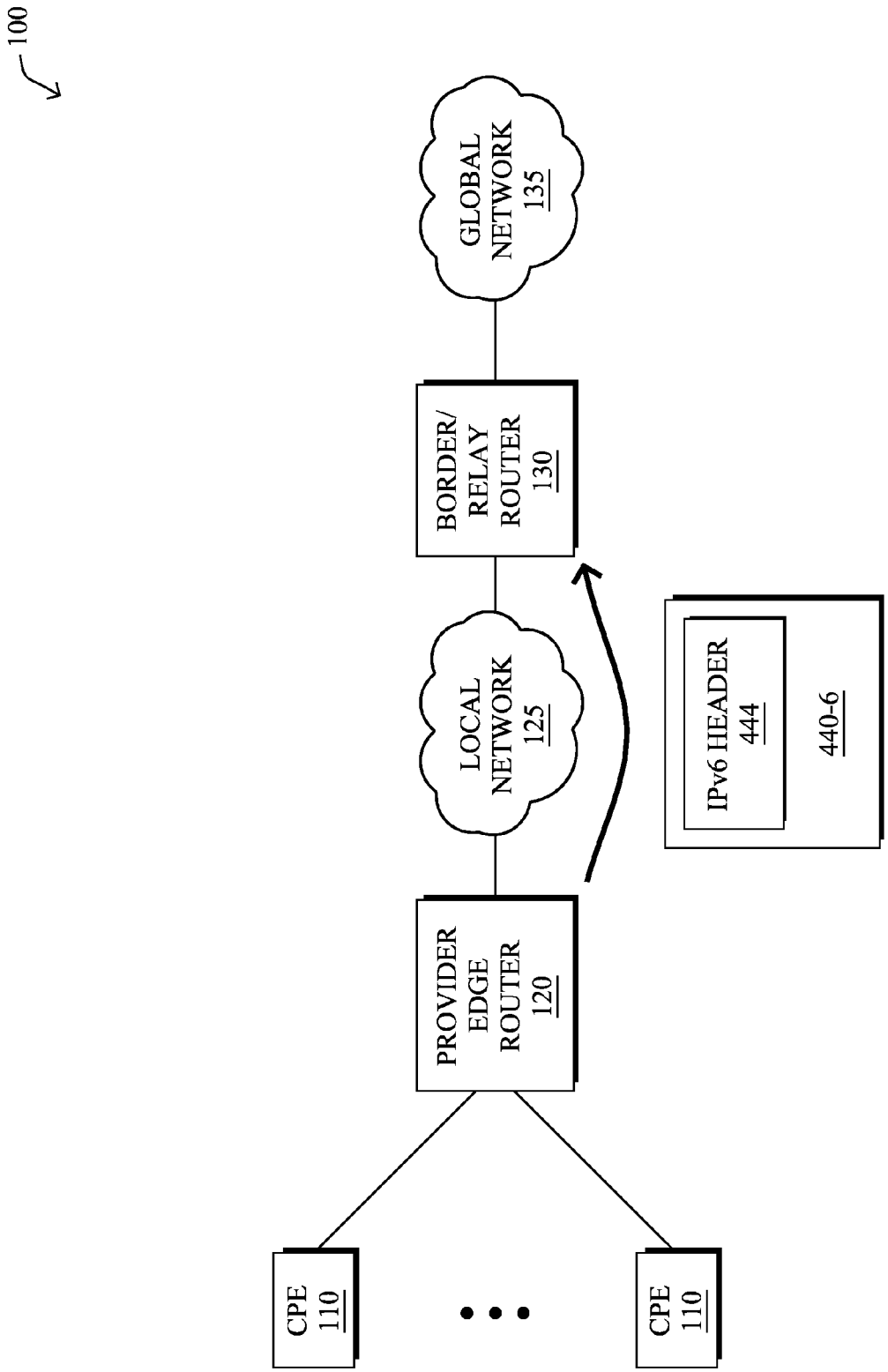
Figure 4C:
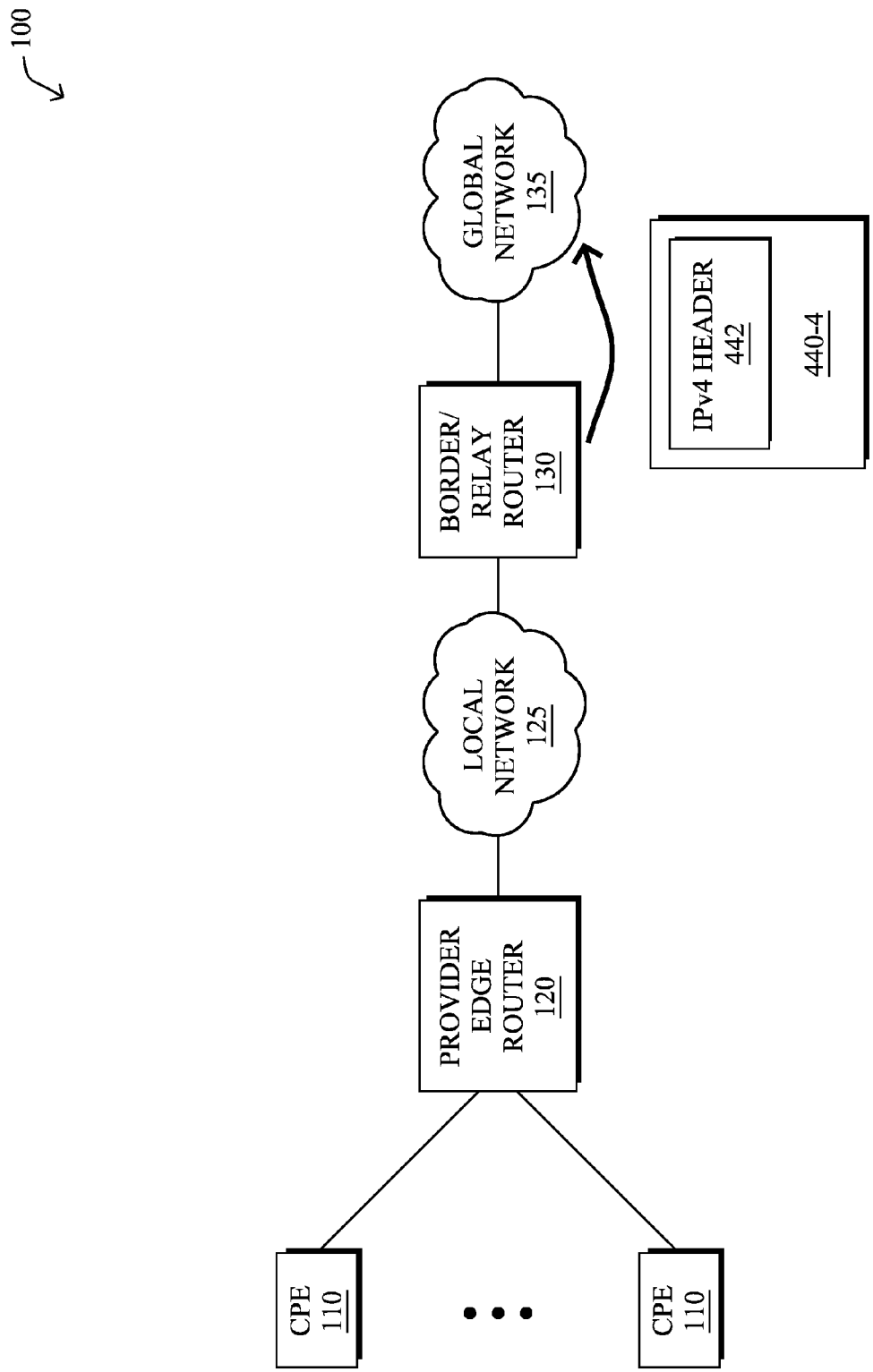

As shown in FIG. 4A, when a CPE device sends an IPv4 packet 440-4 (with IPv4 header 442) to the PE device, the PE device uses a CPE session context to map the CPE router-sent IPv4 packets 140*a* to convert them into IPv6 packets using the IPv6 prefix (from above) via the stateless MAP function (e.g., NAT46 or IPv4-in-IPv6 encapsulation and vice versa). As shown in FIG. 4B, after this operation, the now-IPv6 packer 440-6 has an IPv6 header 444, which has the IPv6 source address corresponding to the MAP IPv6 prefix and interface-id encoded with the public IPv4 address, and the IPv6 destination address corresponding to the border relay address. As such, as shown in FIG. 4C, the BR router 130, upon receiving the IPv6 packet 440-6 (from the PE device) converts the IPv6 packet into an IPv4 packet 440-4, as per conventional MAP behavior.

Figure 5A:
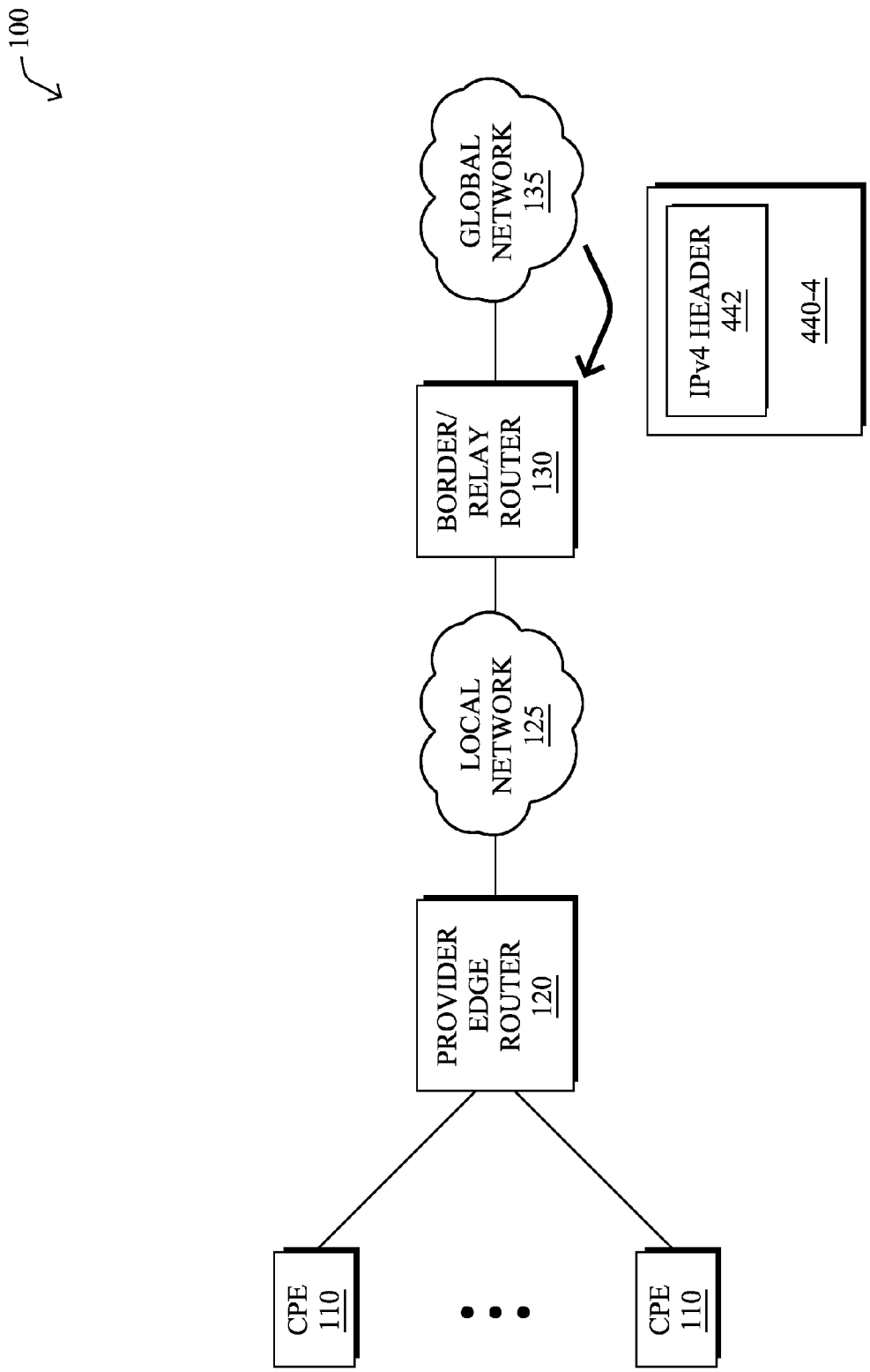
FIGS. 5A-5C illustrate an example packet flow from a border relay to a CPE using a distributed MAP function between CPE devices and a PE device in a computer network.
Figure 5B:
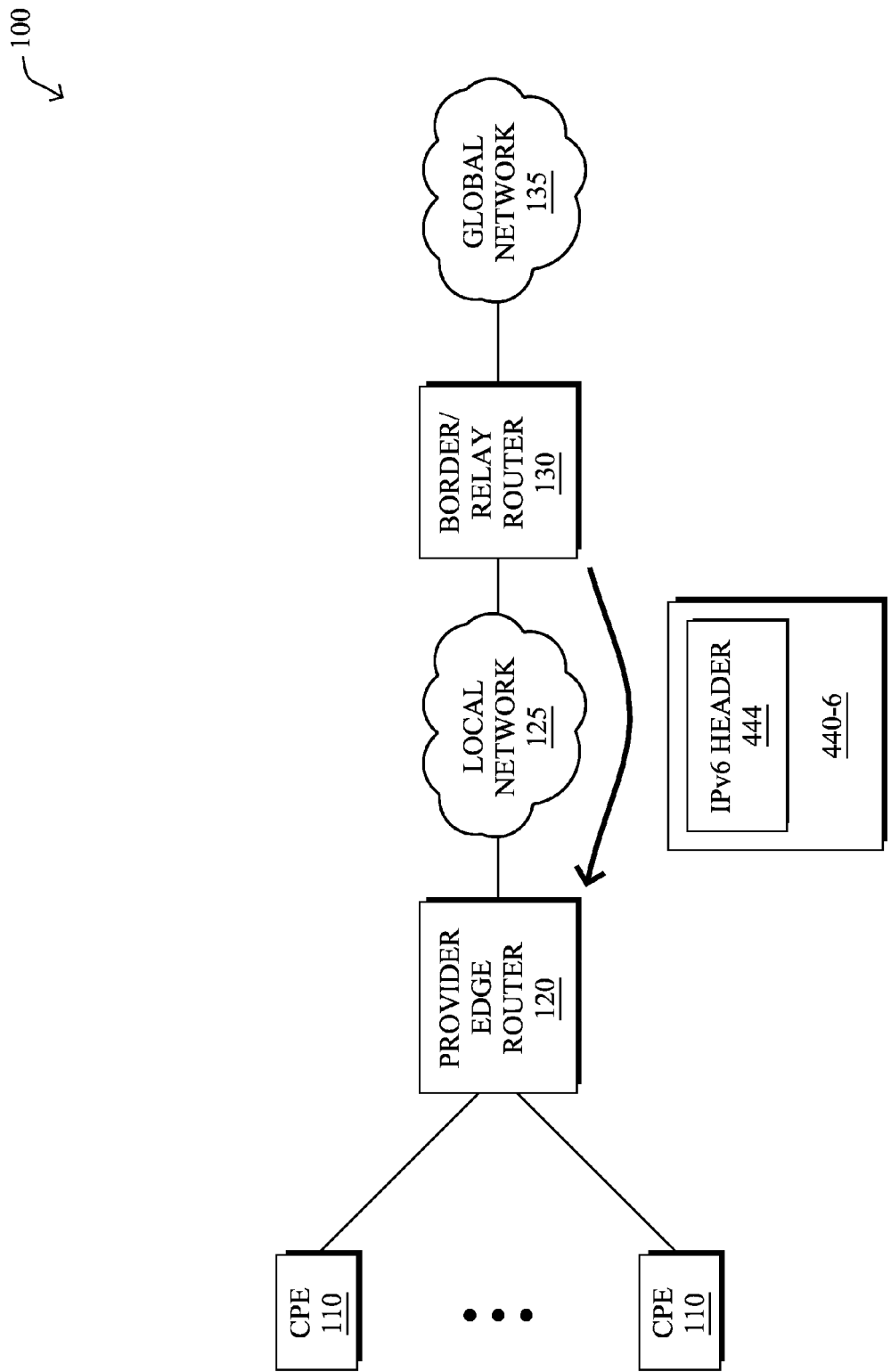
Figure 5C:
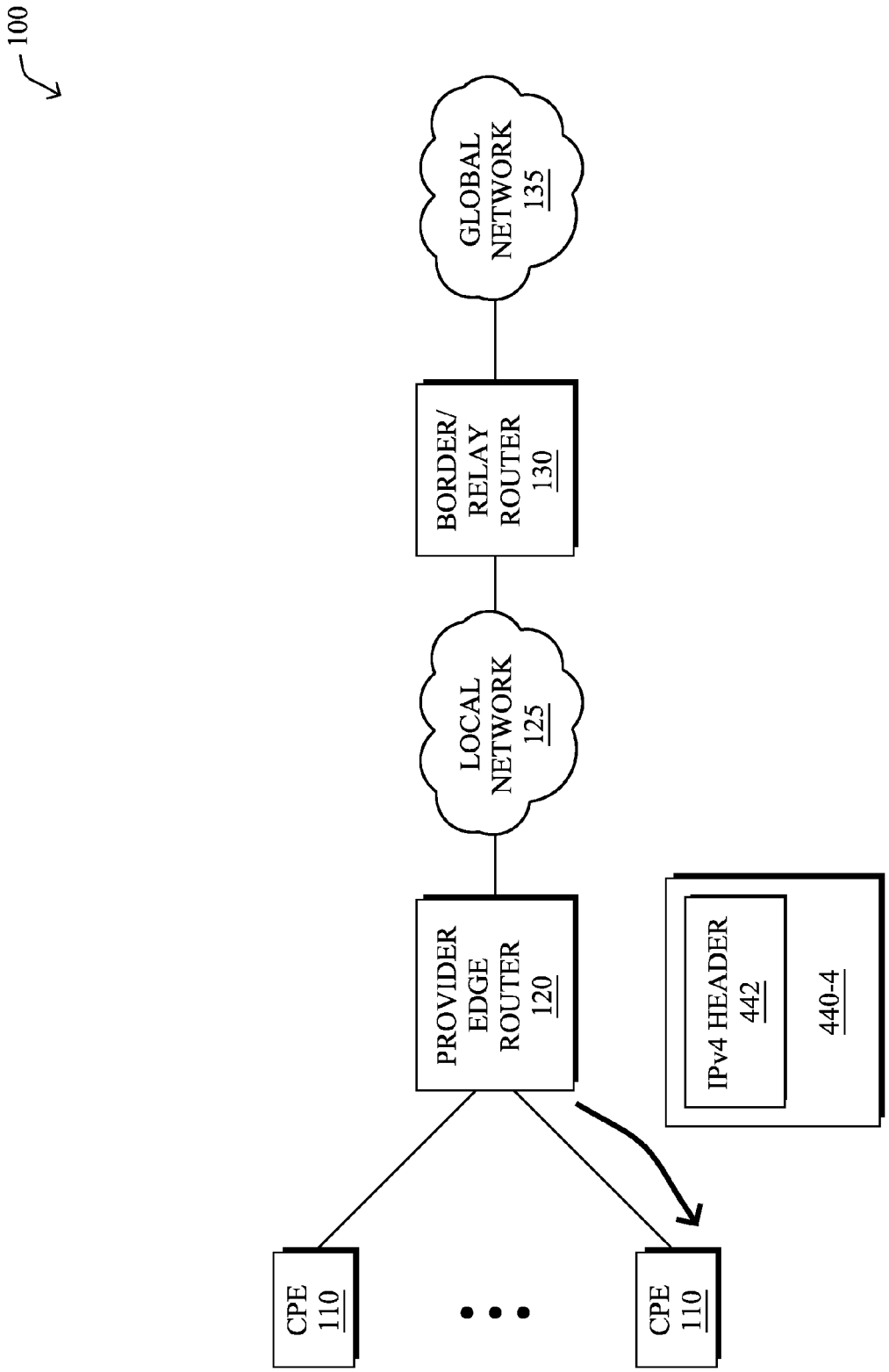

In the reverse, as shown in FIGS. 5A-5C, the BR router 130, upon receiving an IPv4 packet 440-4 (from the Internet) converts the IPv4 packet into an IPv6 packet 440-6, as per conventional MAP behavior, and sends the IPv6 packet to the PE device 120 as shown in FIG. 5B. The PE device, upon receiving the IPv6 packet (from the BR), uses the destination IPv6 address as a longest match key to derive the IPv4 destination address and link-layer address and forwards the IPv4 packet 440-4 towards the CPE device 110 per the CPE router context (e.g., IP session) as shown in FIG. 5C. The CPE device may then perform NAT44 processing to the IPv4 packet 440-4.

Figure 6:
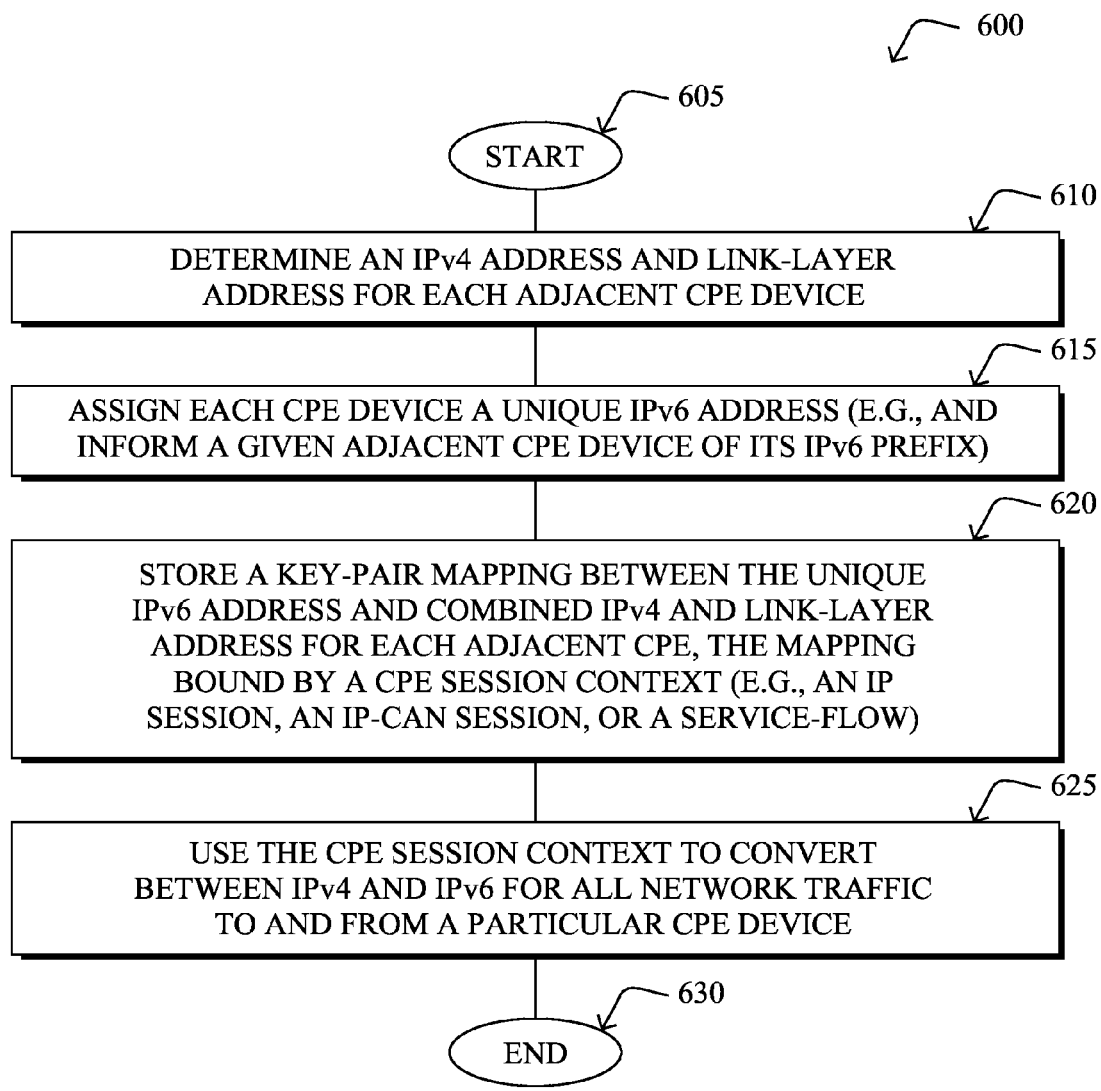
FIG. 6 illustrates an example simplified procedure for a distributed MAP function between CPE devices and a PE device in a computer network, particularly from the perspective of a PE device.

FIG. 6 illustrates an example simplified procedure 600 for a distributed MAP function between CPE devices and a PE device in a computer network in accordance with one or more embodiments described herein, particularly from the perspective of a PE device 120. The procedure 600 may start at step 605, and continues to step 610, where, as described in greater detail above, a PE device 120 determines an IPv4 address and link-layer address for each adjacent CPE device 110 (e.g., where a plurality of adjacent CPE devices may share an IPv4 address, and where there is no direct layer-2 communication between adjacent CPE devices on a shared link segment, as noted above). In step 615 the PE device assigns each CPE device a unique IPv6 address (e.g., and informs them of their IPv6 prefix), and stores a key-pair mapping between the unique IPv6 address and combined IPv4 and link-layer address for each adjacent CPE in step 620. Note that as described above, the mapping is bound by a CPE session context (e.g., an IP session, an IP-CAN session, or a Service-Flow). As also noted above, the IPv6 address may be formed using the MAP domain characteristics configured on the PE, that is, as described above, the assignment of each CPE's IPv6 address may be derived as per the MAP algorithm (e.g., the edge router keeps a binding for each CE of its real IPv4+link-layer address and an IPv6 address compatible with the MAP domain in which the router is located).

Using the CPE session context, in step 625 the PE device may then convert between IPv4 and IPv6 for all network traffic to and from a particular CPE device as described in greater detail above. For instance, as mentioned above, the PE device may convert a CPE context and IPv4 address into an IPv6 address, or may use an IPv6 address of a packet as a longest match key to derive an IPv4 address and link-layer address of a matching CPE device (then forwards the packet as an IPv4 packet towards the matching CPE device per a corresponding CPE session context). The converting itself may notably use techniques such as NAT46, NAT64, Tunneling64, IPv4-in-IPv6 encapsulation, and IPv4-in-IPv6 decapsulation, and so on. The simplified procedure 600 may then end in step 630 (with the option to continue converting/translating, and also reconfiguring addresses and CPE session contexts over time). In addition or in the alternative, such converting may also convert from a CPE context and IPv4 plus link-layer address into an IPv6 address, and/or from a CPE link-layer address into an IPv6 address.

Figure 7:
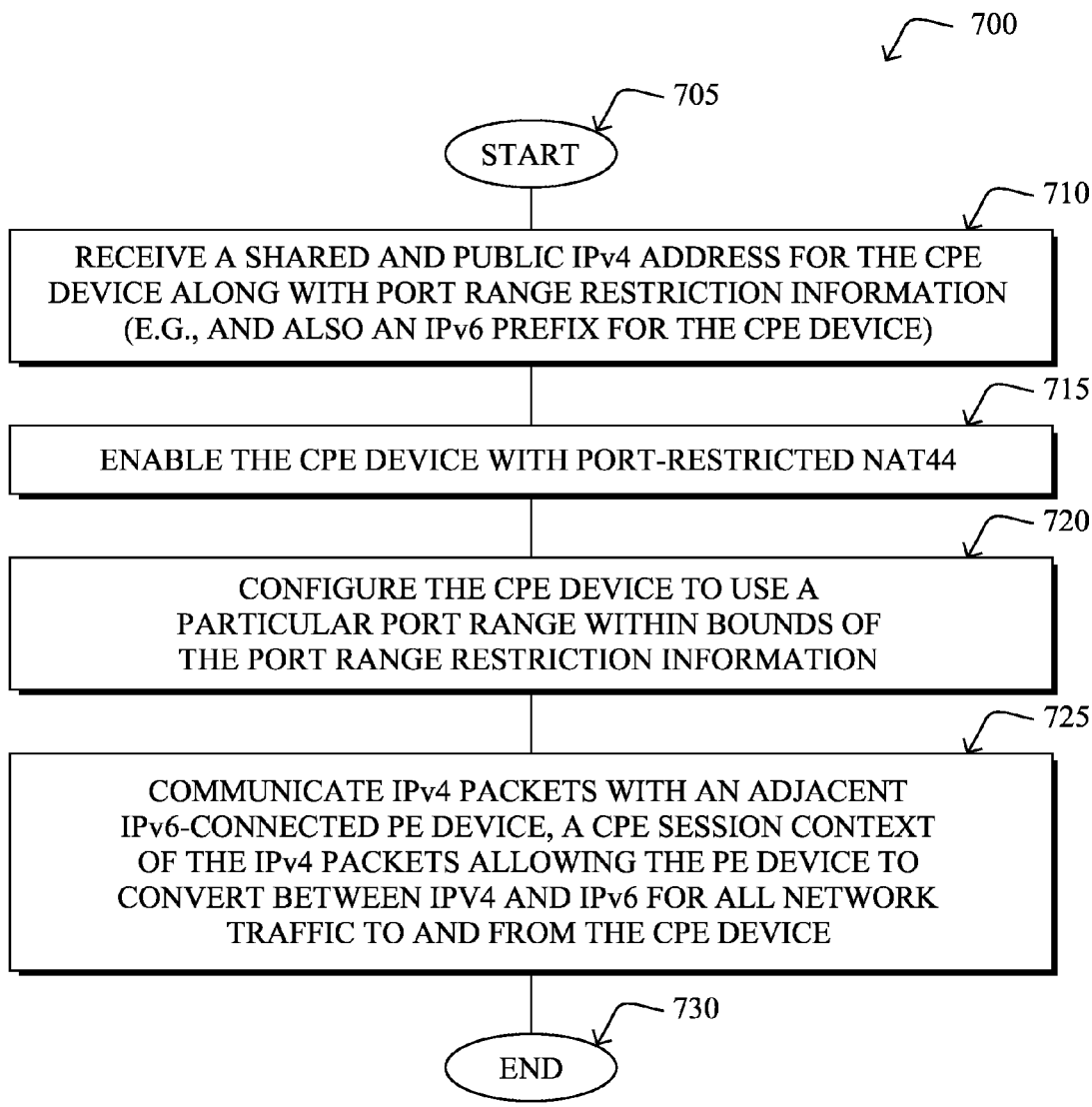
FIG. 7 illustrates an example simplified procedure for a distributed MAP function between CPE devices and a PE device in a computer network, particularly from the perspective of a CPE device.

In addition, FIG. 7 illustrates an example simplified procedure 700 for a distributed MAP function between CPE devices and a PE device in a computer network in accordance with one or more embodiments described herein, particularly from the perspective of a CPE device 110. The procedure 700 may start at step 705, and continues to step 710, where, as described in greater detail above, a CPE device receives a shared and public IPv4 address for the CPE device, along with port range restriction information (e.g., and also an IPv6 prefix for the CPE device). For example, the CPE device may receive this information using a dynamic host configuration protocol (DHCP). In step 715, the CPE device is enabled with port-restricted NAT44, and is configured in step 720 to use a particular port range within bounds of the port range restriction information (e.g., receiving the particular port range from a DOCSIS protocol). Accordingly, in step 725, the CPE device may communicate IPv4 packets with an adjacent IPv6-connected PE device, where a CPE session context of the IPv4 packets allows the PE device to convert between IPv4 and IPv6 for all network traffic to and from the CPE device, as mentioned above. The simplified procedure 700 ends in step 730, notably with the ability to continue communicating traffic but also to receive updated configuration information.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for a distributed MAP function between CPE devices and a PE device in a computer network. In particular, the techniques herein provide numerous advantages, such as requiring only slight changes on the CPE devices, or in certain embodiments, no changes, such as when a given customer is assigned a non-shared IPv4 address. Note also that the CPE devices can be assigned independent IPv6 and IPv4 prefixes (that is, when no IPv4 bits are encoded in an IPv6 prefix assigned to the CPE device), and the techniques herein separate the IPv4 "customer" and IPv6 "operator" domains, thus allowing an operator to deploy IPv6 and MAP at their pace, rather than being set by the limitations of the CPEs. The techniques also offer better IPv6 routing summarization in the network than what is possible with current MAP techniques, that is, IPv6 MAP endpoint addressing according to the techniques herein may be entirely under the operators' control Additionally, the techniques herein extend the notion of an IP session to include the association between IPv6-IPv4-link-layer addresses, whereas today an IP session is a pure IPv4-link-layer association, thus the techniques herein allow for easier implementation leveraging the increasing scale of computer networks. Furthermore, the techniques herein allow for the simplified (yet adequately performing) add-on of stateless NAT64 functionality, as opposed to more complex stateful NAT64. Lastly, the techniques herein may be transparently combined/extended to support MAP-T/-E or even integrated with DS-lite deployments (that is, the operator is not as heavily locked into the technology that is supported by a given CPE, but can make a technology selection by modifying the functionality of a smaller number of PE devices).

While there have been shown and described illustrative embodiments that provide for a distributed MAP function between CPE devices and a PE device in a computer network, it is to be understood that various other adaptations and modifications may be made within the spirit and scope of the embodiments herein. For example, the embodiments have been shown and described herein with relation to particular protocols or naming conventions. However, the embodiments in their broader sense are not as limited, and may, in fact, be used with other types of protocols and/or naming conventions. For example, though the techniques below may generally relate to the MAP-T solution (that does not use IPinIP encapsulation), it is similarly applicable to an encapsulation based solution (e.g., "MAP-E").

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a provider edge (PE) device in a computer network, an IPv4 address and link-layer address for each customer premise equipment (CPE) device that is connected to a provider network through the PE device, wherein the PE device is a next hop from the CPE device;
   assigning, by the PE device, each CPE device a unique IPv6 address;
   in response to assigning, storing, by the PE device, a key-pair mapping between the unique IPv6 address and combined IPv4 and link-layer address for each CPE device that is connected to the provider network through the PE device, the mapping bound by a CPE session context, wherein the CPE session context is at least one of an IP Session, IP Connectivity Access Session (IP-CAN), or a Service-Flow; and
   using, by the PE device, the CPE session context to convert between IPv4 and IPv6 for all network traffic to and from a particular CPE device, wherein the key-pair mapping is separated from stateful forwarding associated with a particular port range within bounds of port range restriction information executing on each CPE respectively; and
   communicating, by the PE device, the converted network traffic to and from the particular CPE.

2. The method as in claim 1, wherein a plurality of adjacent CPE devices share an IPv4 address, and wherein there is no direct layer-2 communication between adjacent CPE devices on a shared link segment.

3. The method as in claim 1, wherein a plurality of adjacent CPE devices do not share an IPv4 address.

4. The method as in claim 1, wherein converting executes NAT46, NAT64, Tunneling64, IPv4-in-IPv6 encapsulation, or IPv4-in-IPv6 decapsulation.

5. The method as in claim 1, further comprising:
informing a given CPE device that is connected to the provider network through the PE device of the given CPE device's IPv6 prefix.

6. The method as in claim 1, wherein converting comprises:
converting the CPE session context and an IPv4 address into an IPv6 address.

7. The method as in claim 1, wherein converting comprises:
converting the CPE session context and an IPv4 plus link-layer address into an IPv6 address.

8. The method as in claim 1, wherein converting comprises:
converting a CPE link-layer address into an IPv6 address.

9. The method as in claim 1, wherein converting comprises using an IPv6 address of a packet as a longest match key to derive an IPv4 address and link-layer address of a matching CPE device, the method further comprising:
forwarding the packet as an IPv4 packet towards the matching CPE device per a corresponding CPE session context.

10. A method, comprising:
receiving, by a customer premise equipment (CPE) device in a computer network, a shared and public IPv4 address for the CPE device along with port range restriction information;
enabling the CPE device with port-restricted NAT44;
configuring the CPE device to use a particular port range within bounds of the port range restriction information;
communicating IPv4 packets with an IPv6-connected provider edge (PE) device that connects CPE device to a provider network, a CPE session context of the IPv4 packets allowing the PE device to convert between IPv4 and IPv6 for all network traffic to and from the CPE device, wherein the PE device is a next hop from the CPE device, wherein the CPE session context is at least one of an IP Session, IP Connectivity Access Session (IP-CAN), or a Service-Flow, wherein key-pair mapping is executed on the PE and stateful forwarding is executed on the CPE device, and
receiving an IPv6 prefix for the CPE device from the PE device, wherein the IPv6 prefix bound under a session keyed by an IPv4 address and link-layer addresses combination of the CPE device.

11. The method as in claim 10, wherein receiving comprises using a dynamic host configuration protocol (DHCP).

12. The method as in claim 10, further comprising:
receiving the particular port range from a Data Over Cable Service Interface Specification (DOCSIS) protocol.

13. An apparatus, comprising:
one or more network interfaces to communicate as a provider edge (PE) device in a computer network;
a processor coupled to the network interfaces and adapted to execute one or more processes; and
a memory configured to store a process executable by the processor, the process when executed operable to:

determine an IPv4 address and link-layer address for each customer premise equipment (CPE) device that connects to a provider network through the apparatus;
assign each CPE device a unique IPv6 address;
store a key-pair mapping between the unique IPv6 address and combined IPv4 and link-layer address for each CPE device that is connected to the provider network through the PE device, the mapping bound by a CPE session context, wherein the CPE session context is at least one of an IP Session, IP Connectivity Access Session (IP-CAN), or a Service-Flow, wherein the PE device is a next hop from the CPE device; and
use the CPE session context to convert between IPv4 and IPv6 for all network traffic to and from a particular CPE device, wherein the key-pair mapping is separated from stateful forwarding associated with a particular port range within bounds of port range restriction information executing on each CPE respectively; and
communicating the converted network traffic to and from the particular CPE.

14. The apparatus as in claim 13, wherein a plurality of adjacent CPE devices share an IPv4 address, and wherein there is no direct layer-2 communication between adjacent CPE devices on a shared link segment.

15. The apparatus as in claim 13, wherein the process when executed to convert is further operable to use a technique selected from a group consisting of: NAT46, NAT64, Tunneling64, IPv4-in-IPv6 encapsulation, and IPv4-in-IPv6 decapsulation.

16. The apparatus as in claim 13, wherein the process when executed is further operable to:
inform a given adjacent CPE device of the given adjacent CPE device's IPv6 prefix.

17. The apparatus as in claim 13, wherein the process when executed to convert is further operable to:
convert a CPE context and IPv4 address into an IPv6 address.

18. The apparatus as in claim 13, wherein the process when executed is further operable to:
convert using an IPv6 address of a packet as a longest match key to derive an IPv4 address and link-layer address of a matching CPE device; and
forward the packet as an IPv4 packet towards the matching CPE device per a corresponding CPE session context.

19. An apparatus, comprising:
one or more network interfaces to communicate as a customer premise equipment (CPE) device in a computer network;
a processor coupled to the network interfaces and adapted to execute one or more processes; and
a memory configured to store a process executable by the processor, the process when executed operable to:
receive a shared and public IPv4 address for the CPE device along with port range restriction information;
enable the CPE device with port-restricted NAT44;
configure the CPE device to use a particular port range within hounds of the port range restriction information;
communicate IPv4 packets with a IPv6-connected provider edge (PE) device that connects the apparatus to a provider network, a CPE session context of the IPv4 packets allowing the PE device to convert between IPv4 and IPv6 for all network traffic to and from the CPE device, wherein the CPE session context is at least one of an IP Session, IP Connectivity Access Session (IP-CAN), or a Service-Flow, wherein the PE device is a next hop from the CPE device, wherein the key-pair mapping is separated from stateful forwarding executing on the CPE device;

receive an IPv6 prefix for the CPE device from the PE device, wherein the IPv6 prefix bound under a session Keyed by an IPv4 address and link-layer addresses combination of the CPE device.

20. The apparatus as in claim 19, wherein the process when executed to receive is further operable to:

use a dynamic host configuration protocol (DHCP).

21. The apparatus as in claim 19, wherein the process when executed is further operable to:

receive the particular port range from a Data Over Cable Service Interface Specification (DOCSIS) protocol.

\* \* \* \* \*